(12) United States Patent
Rosati (10) Patent No.: US 9,711,304 B2
(45) Date of Patent: Jul. 18, 2017

(54) BICYCLE CONTROL DEVICE AND METHOD FOR MANUFACTURING IT

(71) Applicant: CAMPAGNOLO S.r.l., Vicenza (IT)

(72) Inventor: Stefano Rosati, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/873,954

(22) Filed: Oct. 2, 2015

(65) Prior Publication Data

US 2016/0099121 A1 Apr. 7, 2016

(30) Foreign Application Priority Data

Oct. 3, 2014 (IT) .............................. MI2014A1739

(51) Int. Cl.
| | | |
|---|---|---|
| *H01H 21/22* | (2006.01) | |
| *B62M 25/08* | (2006.01) | |
| *B62K 23/06* | (2006.01) | |
| *H01H 11/00* | (2006.01) | |
| *H01H 21/36* | (2006.01) | |

(52) U.S. Cl.
CPC ............ *H01H 21/22* (2013.01); *B62K 23/06* (2013.01); *B62M 25/08* (2013.01); *H01H 11/00* (2013.01); *H01H 21/36* (2013.01); *H01H 2231/026* (2013.01)

(58) Field of Classification Search
CPC . B62M 25/08; B62K 23/06; H01H 2231/026; H01H 21/22; H01H 21/36; H01H 11/00
USPC .... 200/61.12, 293, 61.88, 331; 74/502, 489, 74/473.12, 473.13; 174/667
See application file for complete search history.

(56) References Cited

U.S. PATENT DOCUMENTS

| | | |
|---|---|---|
| 5,446,628 A | 8/1995 | Blom |
| 7,049,944 B2 | 5/2006 | Uno |
| 7,363,873 B2 | 4/2008 | Iteya |
| 7,703,350 B2 * | 4/2010 | Fujii ..................... B62K 23/06 200/61.88 |

(Continued)

FOREIGN PATENT DOCUMENTS

| | | |
|---|---|---|
| CN | 202806571 U | 3/2013 |
| DE | 102009005777 A1 | 8/2010 |

(Continued)

OTHER PUBLICATIONS

Italian Search Report and Written Opinion in Italian Application No. IT MI2014A001736, May 4, 2015 with English translation.

(Continued)

*Primary Examiner* — Edwin A. Leon
(74) *Attorney, Agent, or Firm* — Volpe and Koenig, P.C.

(57) ABSTRACT

A control device for a bicycle on-board electronic device that includes: a switch for inputting a command of the on-board electronic device. There is a control member with a constraint region, a driving region configured to be pushed by a cyclist's finger, and a driven region configured to actuate the switch when the driving region is actuated. The control member resembles a control lever where the constraint region, driving region, and the driven region are arranged on an oblong body that is elastically yielding about the constraint region, whereby the driven region is displaced with respect to the driving region and/or to the constraint region by virtue of the elastic yielding.

11 Claims, 5 Drawing Sheets

(56) References Cited

U.S. PATENT DOCUMENTS

| | | | |
|---|---|---|---|
| 7,841,255 B2* | 11/2010 | Fujii | B62K 23/04 |
| | | | 200/61.85 |
| 8,035,046 B2* | 10/2011 | Perini | B62K 23/02 |
| | | | 200/61.88 |
| 2004/0190302 A1 | 9/2004 | Mascadri et al. | |
| 2006/0007693 A1 | 1/2006 | Grepper | |
| 2007/0014120 A1 | 1/2007 | Kitamura | |
| 2007/0235308 A1 | 10/2007 | Sharrah | |

FOREIGN PATENT DOCUMENTS

| | | |
|---|---|---|
| EP | 1264765 A1 | 12/2002 |
| EP | 1820724 A2 | 8/2007 |
| EP | 1964763 A1 | 9/2008 |
| JP | 3166295 U | 2/2011 |
| JP | 2013006466 A | 1/2013 |
| TW | M427342 U | 4/2012 |

OTHER PUBLICATIONS

Italian Search Report and Written Opinion in Italian Application No. IT MI2014A001740, Jan. 7, 2015 with English translation.
Italian Search Report and Written Opinion in Italian Application No. IT MI2014A001739, May 11, 2015 with English translation.
European Search Report for Application No. EP15191077.5-1755, dated Dec. 10, 2015.

* cited by examiner

BICYCLE CONTROL DEVICE AND METHOD FOR MANUFACTURING IT

CROSS REFERENCE TO RELATED APPLICATION

This application claims the benefit of Italian Application No. MI2014A001739, which was filed on Oct. 3, 2014, and is incorporated herein by reference as if fully set forth.

FIELD OF INVENTION

The present invention relates, in general, to a bicycle control device as well as to a method for manufacturing it.

BACKGROUND

The present invention relates more specifically to a bicycle control device for imparting at least one electric-electronic control to at least one equipment of the bicycle, such as an electromechanical derailleur or a cyclecomputer.

Known bicycle control devices comprise one or more manual actuation members, of the lever type, namely rigid bodies actuated with a rotary movement about a pivot or fulcrum, or of the button type, namely actuated with a linear movement, said manual actuation members being actuatable with one finger or with plural fingers. Typically, the manual actuation members are supported by a body suitable for fixing at a grip portion of the handlebars.

In the case of control devices for imparting at least one electrical-electronic command, the manual actuation members typically act on respective electric switches, of the microswitch type, each including a deformable dome-shaped diaphragm. In order to switch the switches, an actuation head fixed to the respective manual actuation member faces the deformable diaphragm in the rest condition of the manual actuation member, and acts by pushing on the deformable diaphragm in the actuation condition of the manual actuation member.

In greater detail, a bicycle typically comprises a rear brake associated with the rear wheel and/or a front brake associated with the front wheel, which are controlled by suitable control devices. Known brake control devices typically comprise a handlebars-fixing-body and a brake lever pivoted to the body to actuate the brake by the traction of an inextensible cable, usually sheathed (Bowden cable), when it is pulled towards the handlebars.

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur is provided for.

A control device of the front derailleur and a control device of the rear derailleur—or only one of the two in the case of simpler gearshifts—are mounted so as to be easily maneuvered by the cyclist, usually on the handlebars, close to the handgrips thereof where the brake lever for controlling the brake of the front and rear wheel, respectively, is also located. Control devices that allow driving both a derailleur in the two directions and a brake are commonly called integrated controls.

Such integrated controls comprise, in particular, a brake lever, a first gearshift lever for example arranged behind the brake lever, and a second gearshift lever for example arranged on a proximal surface of a bicycle-fixing-body of the control device, to command an electromechanical derailleur in the two directions.

By convention, the control device of the front derailleur and the brake lever of the front wheel are located close to the left handgrip, and vice-versa the control device of the rear derailleur and the brake lever of the rear wheel are located close to the right handgrip.

Control devices are also known wherein a single lever is capable of rotating about two or three axes to perform two or three functions among the brake control lever function, the upward gearshifting control lever function and the downward gearshifting control lever function.

Specialised racing handlebars are also known, which have two or four bars or ends facing prominently forwards, which allow the cyclist to maintain a position of the torso greatly inclined forwards, which is aerodynamically efficient. With these handlebars, specific control devices are also used, both for the brakes and for the gearshift; these devices are commonly called bar-end since they are indeed housed at the ends of the handlebars, so that the cyclist can actuate them easily without having to change his/her position.

In the case of an electronically servo-assisted gearshift, or in short electronic gearshift, one or two control levers can be used to impart a command to increase the gear ratio and a command to reduce the gear ratio, control electronics that suitably drive the front and/or rear derailleur to actuate each command being provided for.

The technical problem at the basis of the invention is to provide a control device that is particularly simple to make and to mount.

SUMMARY OF THE INVENTION

In the present description and in the attached claims, the expression "bicycle control device for imparting at least one electrical-electronic command" should not be taken in the limiting sense to exclude that the control device can also impart one or more mechanical command to one or more mechanical equipments of the bicycle, such as a mechanical derailleur and/or a mechanical brake.

The present invention applies to all types of control devices described above and in principle to any device suitable for imparting commands to electrical and/or electronic equipment of the bicycle, such as a derailleur, a so-called cyclecomputer, etc.

The present invention relates to a control device of a bicycle on-board electronic device, comprising:
  at least one electric switch, a change of state of the at least one switch inputting a command of the on-board electronic device,
  at least one control member having a constraint region, a driving region configured to be pushed by at least one finger, and a driven region configured to actuate said at least one switch when said driving region is actuated upon,
wherein said at least one control member is a lever-resembling control member, wherein said constraint region, said driving region, and said driven region are made on an oblong body elastically yielding about the constraint region, wherein the driven region is displaced with respect to the driving region and/or to the constraint region purposely by virtue of the elastical yield.

BRIEF DESCRIPTION OF THE DRAWINGS

The features and advantages of the present invention will become clearer from the following detailed description of some embodiments thereof, made hereinafter for purely indicating and not limiting purposes with reference to the attached drawings. In the drawings.

DETAILED DESCRIPTION OF THE PREFERRED EMBODIMENTS

In the present description and in the attached claims, under the term "lever-resembling control member" it is meant to indicate a control member that, in an analogous manner to a mechanical lever, has a longitudinal axis, is constrained at a first position along the longitudinal axis, and transmits a resistance force at a second position along the longitudinal axis when a driving force is applied thereto at a third position along the longitudinal axis; unlike a mechanical lever, however, a lever-resembling control member according to the invention is not a rigid body—except for unintentional deformations—that is designed to rotate about the first constraint position, rather is a body that is flexible along the longitudinal axis, that is designed to obtain a relative displacement between the driven region and the constraint region.

The displacement essentially occurs exclusively by virtue of the elastical yield.

Preferably, the constraint region is not a pivoting region, namely it does not have pivots and/or pivot seats.

The constraint region is a region that is irremovably fixed—in use conditions—to something else.

Advantageously, in this way constraint pivots and return elements (springs) are avoided, so that the assembly time and costs are reduced with respect to a conventional pivoted control lever.

Preferably, the constraint region constrains said at least one lever-resembling control member to a brake lever, but it can also constrain it to a bicycle-fixing-body or to the bicycle itself.

Preferably, each lever-resembling control member is associated with only one respective switch, but a lever-resembling control member could be associated with two switches, actuating one of them if its pressing region is pushed in a first direction and another one if its pressing region is pushed in a second direction or harder in the first direction.

Preferably, two of said lever-resembling control members, having the respective driven region associated with a respective switch, are made on a single body.

The control member or the single body, respectively, and the at least one electric switch can be fixed, independently of each other, to a bicycle, or to a bicycle-fixing-body, in particular to bicycle handlebars.

Preferably, however, the control member or the single body, respectively, and the at least one electric switch can be fixed, independently of each other, to a brake lever.

More preferably, the brake lever is pivoted to a bicycle-fixing-body, in particular to bicycle handlebars.

In this way a control "sub-set" or assembly is formed that can easily be replaced as a single block. It is therefore made easier to store sub-sets differing for example in terms of size, shape, colour, material, etc. Moreover, the sub-sets can differ in the number of control members, for example comprising only the brake lever, or the brake lever and a lever-resembling control member, or the brake lever and two or more lever-resembling control members, or only two or more lever-resembling control members etc.

More preferably, the single body is configured to insert into a rear channel of a brake lever.

In an embodiment, two of said lever-resembling control members, having the respective driven region associated with a respective switch, are made on a single body, a common constraint region constraining said two lever-resembling control members to a brake lever.

Preferably, the single body has a channel-shaped configuration and the at least one switch is shaped to insert within the channel of the single body.

Preferably, the electric switch is of the sudden deformation membrane type.

Preferably, in the driving region there is an electric switch actuation projection.

Such a projection can comprise an actuation pin.

Advantageously the pin is fixed with respect to the driving region, because the elasticity and "click feeling" are inherent to the elastic yield of the lever-resembling control member.

Preferably, the elastically yielding oblong body has a comparatively high yield in a pushing direction on the driving region, and a comparatively low yield in two directions perpendicular to the pushing direction and to each other.

More preferably, the elastically yielding oblong body has a comparatively low thickness in a pushing direction on the driving region, and a comparatively high thickness in two directions perpendicular to the pushing direction and to each other.

Preferably, said at least one switch is mounted on a printed circuit board (PCB).

Preferably, when there are at least two switches, they are mounted on a same PCB, more preferably on two opposite faces of the PCB.

The PCB is/can be housed in a casing.

In an embodiment, the PCB communicates wireless with the on-board electronic device, and the PCB comprises a transmitter or transceiver and a battery power source.

In another embodiment, the PCB communicates via cable with the on-board electronic device, a connector being provided, matching a connector on the bicycle, and preferably on the bicycle-fixing-body.

Preferably, in this case the PCB is powered via cable by a power source of the on-board device, the power cable(s) passing in the same connector.

More preferably, said at least one switch comprises two switches mounted on a same printed circuit board (PCB), the PCB being housed within a channel defined in a single body carrying said two lever-resembling control members.

Preferably, said at least two lever-resembling control members are selected from the group consisting of a member control for gearshifting in a first gearshifting direction, a member control for gearshifting in a second gearshifting direction, a member for inputting a command of an on-board electronic device.

Preferably, the bicycle on-board electronic device comprises at least one electromechanical derailleur.

Preferably, each lever-resembling control member is made of composite material comprising a matrix of thermoplastic or thermosetting material and reinforcing fibre, preferably carbon fibre, glass fibre, aramid fibre, ceramic fibre, boron fibre and/or combinations thereof.

Alternatively, each lever-resembling control member is made of metal, preferably steel or aluminum, and said constraint region comprises a welding region.

Each lever-resembling control member or said single body can be fixed to the brake lever, to the bicycle-fixing-body or directly to the bicycle through screws.

In embodiments, each lever-resembling control member or said single body is co-moulded with said brake lever.

In an aspect thereof, the present invention relates to a method for manufacturing a control sub-set of a control device of a bicycle on-board electronic device, comprising the steps of:
- arranging, in a mould, at least one layer of composite material comprising a thermoplastic or thermosetting matrix with reinforcing fibre to form a control lever and at least one lever-resembling control member as a single piece,
- arranging, in the mould, an anti-adhesion material between said lever and said at least one lever-resembling control member,
- subjecting the mould cavity to a suitable temperature and/or pressure profile for the cross linking or setting of the thermoplastic or thermosetting matrix,
- extracting the single piece from the mould,
- removing the anti-adhesion material.

In an aspect thereof, the present invention relates to a control device of a bicycle on-board electronic device, comprising:
- a bicycle-fixing-body, and
- a control sub-set comprising at least one lever-resembling control member,
wherein the control sub-set can be disassembled as a single piece from the bicycle-fixing-body, without the components of the control sub-set being disassembled from each other.

Hereinbelow and in the subsequent claims, the terms: outer, inner, upper, lower, side, distal and proximal will be used to indicate geometric and structural elements of the control device and of the components comprising it that are thus oriented in the mounted and rest condition thereof and of bicycle handlebars. In particular, the terms distal and proximal are used with reference to the centre of the handlebars.

FIGS. 1-6 show an embodiment of a bicycle control device 10 according to the invention.

Figures 1, 2:
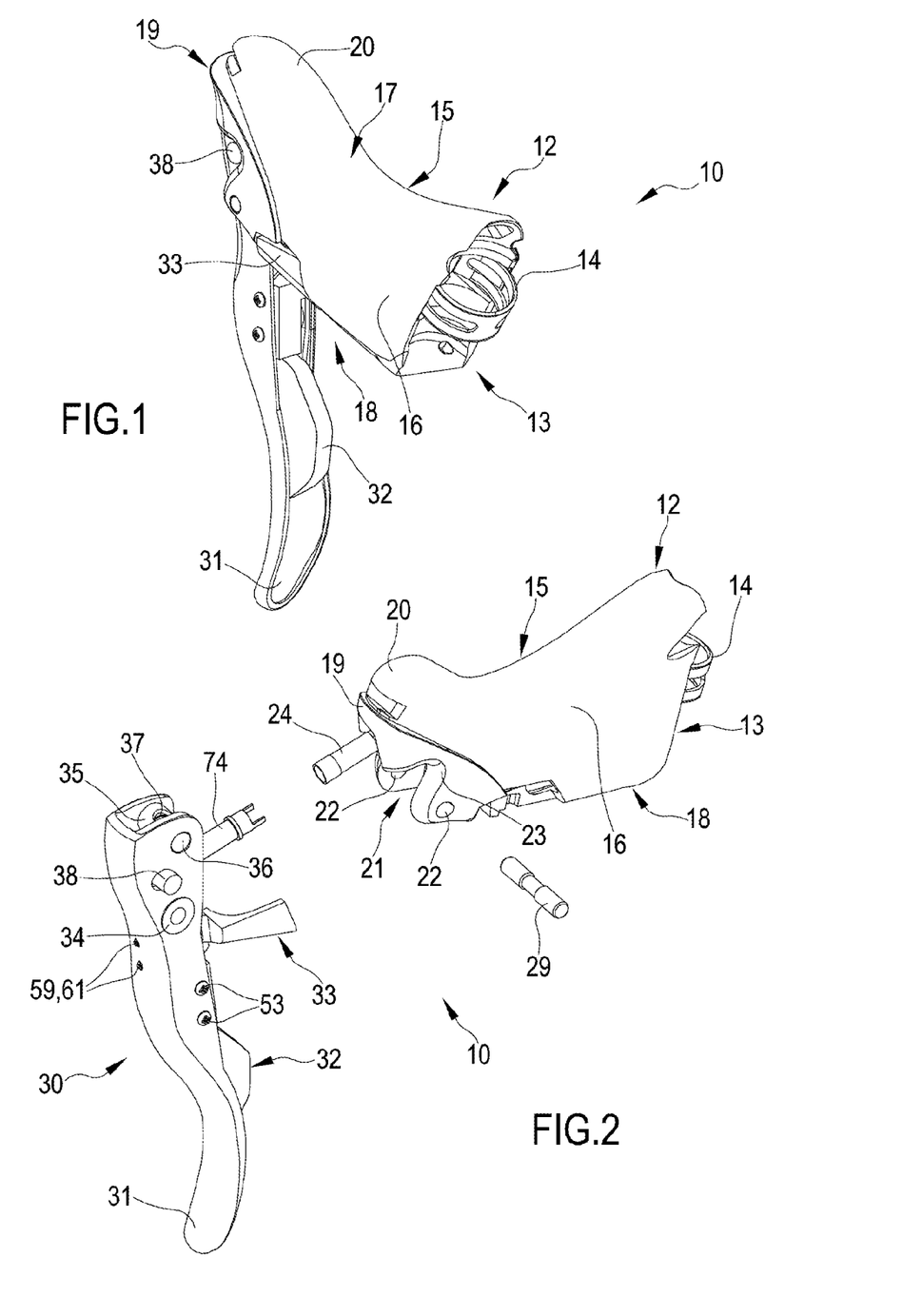
FIG. 1 is a perspective view of an embodiment of a bicycle control device according to the invention, in an assembled condition.
FIG. 2 is a perspective view of the bicycle control device of FIG. 1, in a condition with a control sub-set disassembled.

The control device 10 is a right control device, i.e. intended to be associated with the right end of bicycle handlebars, to be actuated by the cyclist with the right hand. A control device intended to be associated with the left end of the handlebars will substantially be its mirror image.

The illustrated control device 10 comprises a bicycle-fixing-body 12 suitable, in the illustrated embodiment, to be frontally fixed to a curved handgrip portion of bicycle handlebars, at a surface thereof 13 indicated as rear surface 13 with spatial reference to the condition mounted on the handlebars, so as to project frontally of the handlebars, in the travel direction. The fixing will take place through any connection means, like for example through the strap 14 shown.

The bicycle-fixing-body 12 is preferably shaped and sized to be gripped by the cyclist in one travel condition, and to be just above the hand of the cyclist when he/she grips the handlebars in a different travel condition.

The bicycle-fixing-body 12 comprises, in general, an outer or distal side surface 15 (right in the case of the right control device), an inner or proximal side surface 16 (left in the case of the right control device), an upper surface 17, a lower surface 18, and a front surface 19 opposite the aforementioned rear surface 13.

The upper surface 17 is preferably not flat, since in the bicycle-fixing-body 12 a front-upper projection 20 is defined that preferably can be gripped by the cyclist in yet another travel condition.

The specific shape of the bicycle-fixing-body 12 can however vary even considerably from what is illustrated and described above.

A control sub-set or assembly 30 according to the invention is mounted on the bicycle-fixing-body 12 and can be disassembled as a single piece from the bicycle-fixing-body 12, without the components of the control sub-set 30, to be described hereinafter, being disassembled from each other.

This represents an inventive aspect per se.

Preferably, the control sub-set 30 is mounted partially housed in a front-rear recess 21 of the bicycle-fixing-body 12, preferably arranged below the front-upper projection 20.

Figure 3:
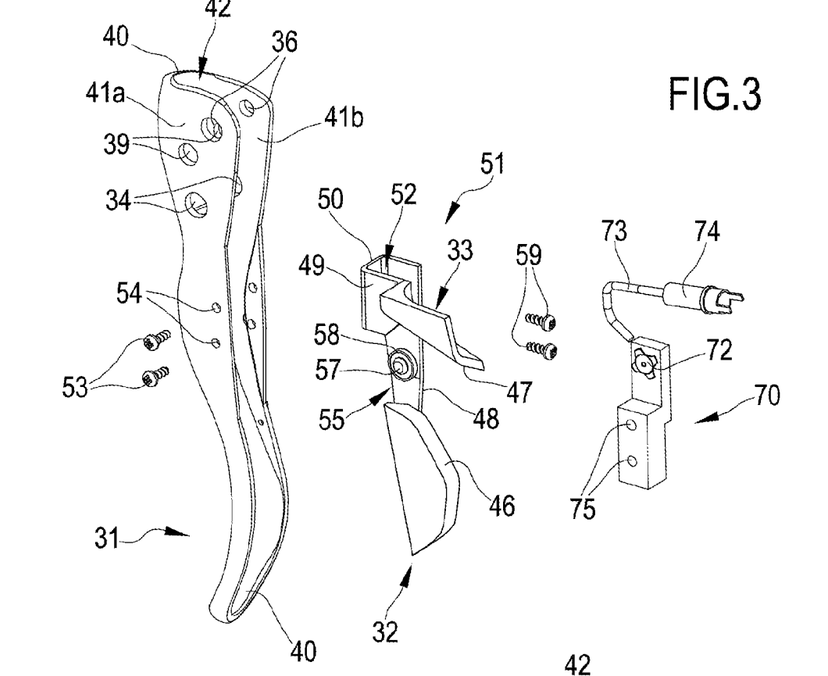
FIG. 3 is a perspective view from a first direction of some components of the control sub-set of FIG. 1, partially exploded.
Figure 4:
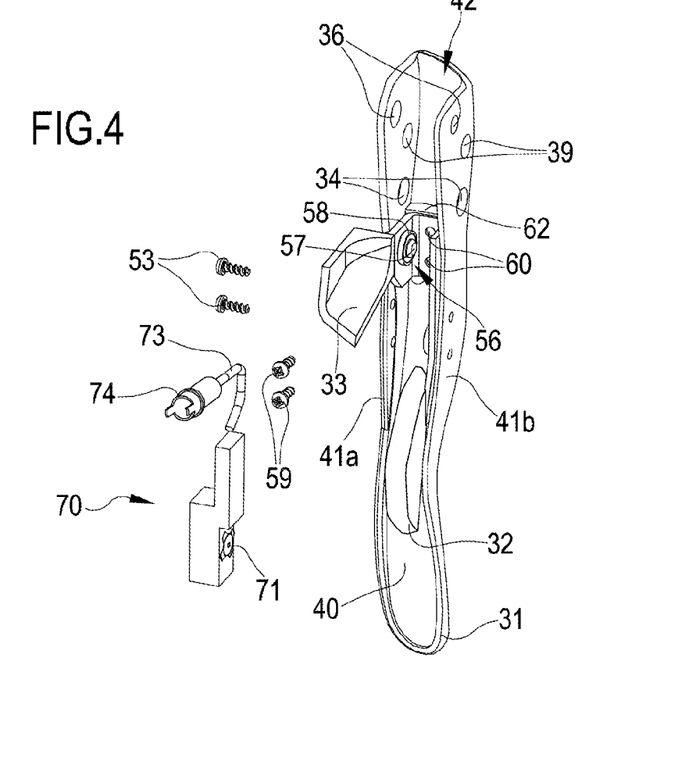
FIG. 4 is a perspective view from a second direction of some components of the control sub-set of FIG. 1, partially exploded.
Figure 5:
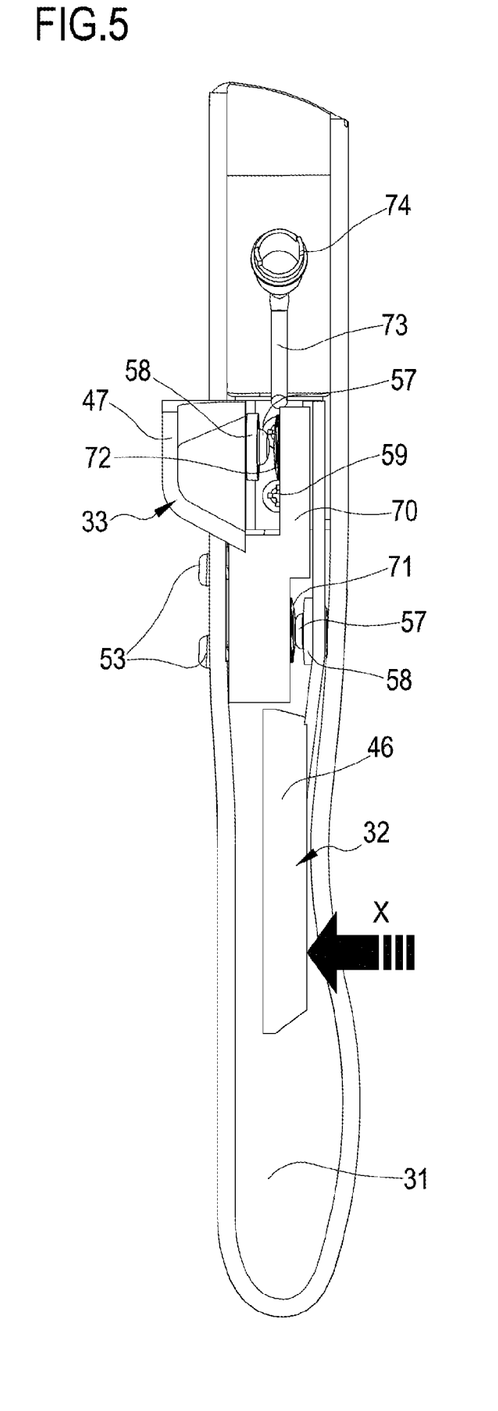
FIG. 5 is a rear view of the control sub-set of FIG. 2, in the mounted condition.
Figure 6:
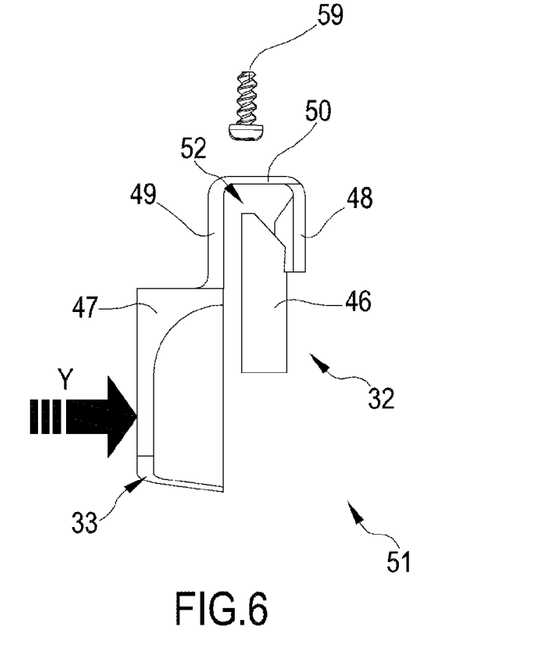
FIG. 6 is a plan view of one of the control members of the control sub-set of FIG. 1.

In order for the user to input commands, the control device 10—and in particular the control sub-set 30—comprises, in the illustrated embodiment, a plurality of manual actuation members, in this case a first mechanical control lever 31 as well as a first lever-resembling control member 32 and a second lever-resembling control member 33 provided for the actuation of electric switches 71 and 72, respectively (see FIGS. 3 and 4).

Preferably, the lever 31 is for actuating a mechanical brake, the first lever-resembling control member 32 is for actuating a derailleur in one direction, preferably towards a toothed wheel having a larger diameter (upward gearshifting), and the second lever-resembling control member 33 is for actuating the derailleur in a second direction, preferably towards toothed wheels having a smaller diameter (downward gearshifting). In the case illustrated, it is therefore a so-called integrated control device. Reference will be made to such a preferred configuration hereinafter, but various alternatives to such a configuration are possible.

For example, the lever-resembling control members 32, 33 can command the increase and reduction, respectively, of a gear ratio given overall by the front derailleur and by the rear derailleur.

In a per se known way, the lever 31 is articulated about a pivot 29 to the bicycle-fixing-body 12. The articulation pivot 29 extends in aligned holes of the lever 31 and of the bicycle-fixing-body 12, respectively indicated as 34 and 22.

In a per se known way, a pivot 35 is articulated to the lever 31 at its holes 36 and has a seat 37 to receive a head of a brake cable (not shown).

A brake release mechanism 38, also per se known, comprises a pin having two operative conditions, in which it projects, respectively from one side or the other of the lever 31, through holes 39 of the lever 31, and interacts with recesses 23 of different depth of the bicycle-fixing-body 12 to tension or de-tension the brake cable, respectively.

The switches 71, 72 are shown made on a printed circuit board (PCB) 70, more specifically on opposite faces of the PCB 70, but this is namely a preferred configuration.

The PCB 70 is preferably co-moulded with a plastic film that makes it waterproof and protects it from dust. Alternatively or in addition, the PCB 70 can be housed in a casing, preferably tight.

The PCB 70 can comprise suitable electrical and/or electronic components that cooperate with the switches 71, 72 for generating and inputting the commands of the on-board device.

An electric cable 73 extends from the PCB 70 to transport the control signal generated by the change of state of each switch 71, 72 to the on-board device (not shown).

The electric cable 73 is preferably provided with a connector 74 matching a connector 24 suitably connected to the on-board electronic device (not shown). The cable (not shown) connected to the connector 24 preferably protrudes from the bicycle-fixing-body 12 at the recess 21.

In a particularly advantageous manner, according to the invention and as better described below, the lever-resembling control members 32, 33 are supported by the lever 31. Therefore, the control sub-set 30 is mounted on the bicycle-fixing-body 12 by inserting the articulation pivot 29 in the holes 22, 34, displacing the release mechanism 38 into de-tensioning position, hooking the head of the brake cable in the seat 37, and displacing the release mechanism 38 into tensioning position; the two matching connectors 24, 74 are then connected to each other, and housed in the recess 21 of the bicycle-fixing-body 12 together with the excess length of the respective electric cables.

The control sub-set 30 is disassembled from the bicycle-fixing-body 12 as a single block, namely as if it were a single piece, with the operations in reverse.

The lever 31 preferably has a C-shaped cross section, being defined by a front wall 40—with reference to the mounted condition—and two side walls 41a and 41b, so as to define a channel 42 that is open rearwards. The front wall 40 is preferably curvilinear so as to be ergonomic. The side walls 41a, 41b are preferably tapered towards the free or lower end of the lever 31.

The first lever-resembling control member 32 is preferably aligned behind the lever 31, more preferably it is partially housed within the rear channel 42 of the lever 31. In such a position, a driving region thereof 46, projecting from the channel 42, is easily accessible with the middle finger and/or forefinger, to be pushed in distal-to-proximal direction X (FIG. 5), namely from outside of the handlebars towards its centre, or from right to left in the case of the right control shown.

The second lever-resembling control member 33 preferably projects canti-levered from the lever 31, also protruding from the bicycle-fixing-body 12. More preferably, the second lever-resembling control member 33 protrudes—with reference to the mounted condition—in a front-lower position from the proximal wall 16 of the bicycle-fixing-body 12. In such a position, a driving region 47 thereof, protruding from the channel 42, is easily accessible with the thumb, to be pushed in proximal-to-distal direction Y (FIG. 6), namely from the centre of the handlebars towards the outside, or from left to right in the case of the right control shown.

The first and the second lever-resembling control member 32, 33 each comprise an oblong body 48, 49 respectively, which is elastically yielding in the direction X and Y, respectively, of pushing with the fingers.

More specifically, the oblong body 48, 49 of each lever-resembling control member 32, 33 has comparatively high yield in such a direction X, Y, respectively, and comparatively low yield in the directions perpendicular to the respective pushing direction X, Y.

The oblong body 48, 49 of each lever-resembling control member 32, 33 has a comparatively low inertia in the pushing direction X, Y, and a comparatively high inertia in the directions perpendicular to the respective pushing direction X, Y.

This can be obtained for example—and as shown—through a cross section of comparatively low thickness in the pushing direction X, Y, and a comparatively high thickness in the directions perpendicular to the respective pushing direction X, Y.

In addition, when the lever-resembling control members 32, 33 are made of composite material, this can be obtained with a suitable orientation of the reinforcing fibres, as will be understood by one skilled in the art.

In the embodiment shown, the oblong body 48 of the first lever-resembling control member 32 has a substantially flat or two-dimensional portion oriented vertically—with reference to the mounted condition—and that extends parallel and along a part of the distal side wall 41b of the lever 31, in close proximity thereto.

The oblong body 49 of the second lever-resembling control member 33 also has a substantially flat or two-dimensional portion oriented horizontally—with reference to the mounted condition—and that extends parallel and along a short section of the proximal side wall 41a of the lever 31, in close proximity thereto.

The two driving regions 46, 47, on the other hand, protrude from the lever 31, as stated above.

In the embodiment shown, the two lever-resembling control members 32, 33 are advantageously made as a single piece, the respective oblong bodies 48, 49 being joined by a flat cross-piece 50 that is housed on the back of the front wall 40 of the lever 31, namely on the bottom of the channel 42.

The two lever-resembling control members 32, 33 with the flat joining cross-piece 50 form a single body 51 having a portion with C-shaped cross section that rests within the channel 42 of the lever 31, and that in turn forms a channel 52.

The PCB 70 is housed within the channel 42 of the lever 31, and partially within the channel 52 of the single body 51.

The PCB 70 is fixed to the lever 31, preferably to the proximal side wall 41a of the lever 31, in the embodiment shown through a pair of attachment screws 53 extending in a corresponding pair of holes 54 of the proximal side wall 41a of the lever 31, and screwed into a corresponding pair of holes 75 of the PCB 70.

The PCB 70 can be constrained to the lever 31 in any other manner, for example through gluing or welding. However, the attachment through screws or rivets is preferable since it allows the PCB 70 to be easily replaced in the case of failure or breaking.

The major faces of the PCB 70 extend parallel to the side walls 41a, 41b of the lever 31 and to the major faces of the substantially flat portions of the oblong bodies 48, 49 of the lever-resembling control members 32, 33.

In the mounted condition, each switch 71, 72, respectively, on the PCB 70 faces a driven region 55, 56, respectively, of the first lever-resembling control member 32 and of the second lever-resembling control member 33, respectively.

The switches 71, 72 are preferably of the microswitch type, each including a deformable dome-shaped diaphragm (not shown). In order to switch the switches, an actuation projection of the respective lever-resembling control member 32, 33 faces the deformable diaphragm in the rest condition of the lever-resembling control member 32, 33, and acts to push on the deformable diaphragm in the actuation condition of the lever-resembling control member 32, 33.

At each driven region 55, 56 there is preferably a projection protruding from the oblong body 48, 49 of the lever-resembling control member 32, 33; said projection can be made through an actuation pin 57 fixed to the oblong body 48, 49 as shown. A reinforcing washer 58 is also shown around each actuation pin 57.

The actuation projection can however also be made as a single piece with the oblong body 48, 49.

The flat cross-piece 50 that joins the two lever-resembling control members 32, 33 in the single body 51 is constrained to the rear face of the front wall 40 of the lever 31, in the embodiment shown through a pair of attachment screws 59 extending in a corresponding pair of holes 60 of the flat cross-piece 50 and screwed into a corresponding pair of holes 61 of the front wall 40 of the lever 31. The holes 61 are preferably made in a widening 62 of the front wall 40 of the lever 31. The holes 61 can be through holes as shown, or blind holes.

The flat cross-piece 50 can be constrained to the front wall 40 of the lever 31 in any other manner, for example through gluing or welding. However, the attachment through screws or rivets allows the lever-resembling control members 32, 33 to be easily replaced in case of breaking.

The flat cross-piece 50 therefore forms a constraint region both for the first lever-resembling control member 32, and for the second lever-resembling control member 33.

It should be noted that the constraint region is not a pivoting region, rather a region that is irremovably fixed, in the case shown to the lever 31.

Thanks to the aforementioned yield in the pushing direction X, Y, when the cyclist pushes on the respective driving region 46, 47, the driven region 55, 56 of each lever-resembling control member 31, 32—and in particular the respective projection or actuation pin 57—exerts a push on the respective switch 71, 72, inputting a respective command for an on-board device of the bicycle.

Advantageously, it is not necessary to provide for any return element of the lever-resembling control members 32, 33 or any elastic element—such as a helical spring extending around the actuation pin, as in the prior art—to actuate the switch. Indeed, the elastic yield itself of the lever-resembling actuation members 32, 33 acts validly for both purposes. For this reason, as stated above the actuation pin 57 can indeed be replaced by a projection made as a single piece with the lever-resembling actuation members 32, 33. Through the invention the articulation pivots of the derailleur control levers or small levers typical of the prior art are also made unnecessary.

The cost of the control device according to the invention is therefore particularly low, it is simple and quick to mount, and its mechanical strength is particularly high.

The lever-resembling control members 32, 33, whether they are made as a single body 51 or individually, can be made of metallic material such as steel or aluminum, but preferably they are made of a composite material like the one described above.

Figure 7:
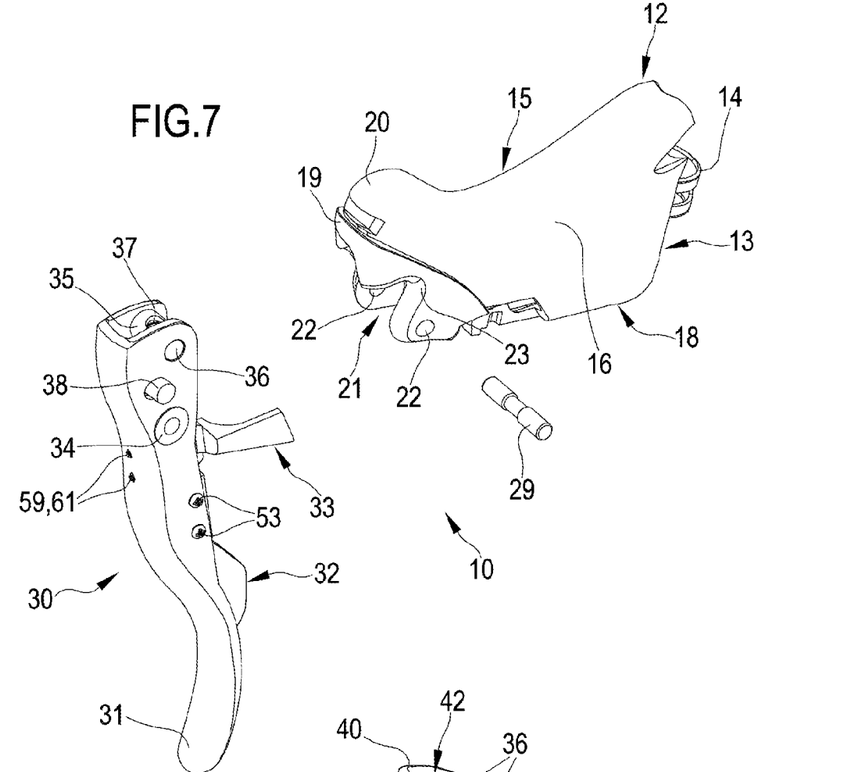
FIG. 7 is a perspective view of a bicycle control device of a further embodiment of the invention, in a condition with a control sub-set disassembled.
Figure 8:
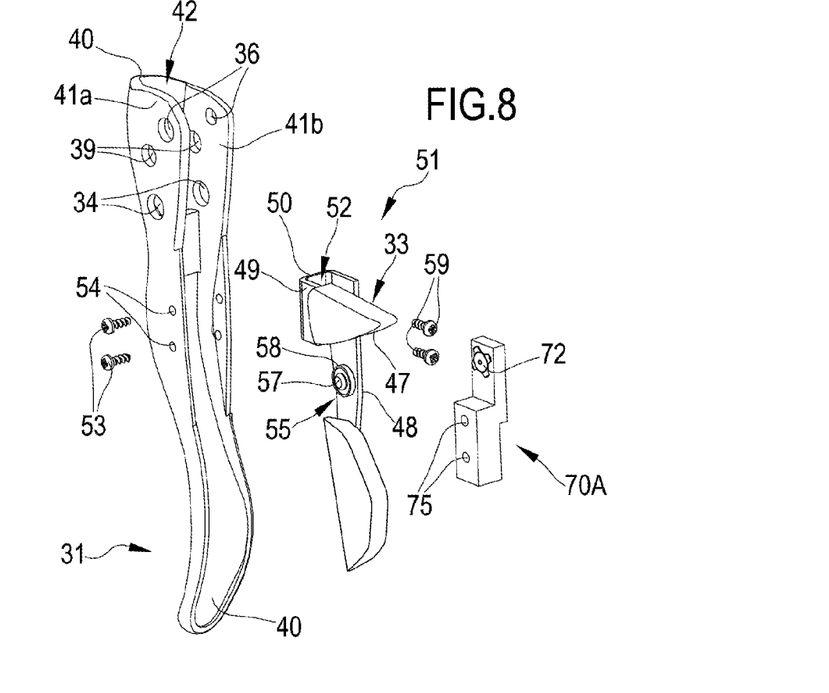
FIG. 8 is a perspective view of some components of the control sub-set of FIG. 7, partially exploded.

FIGS. 7 and 8 show an embodiment that differs from the one shown in FIGS. 1-6 and described above in that the communication of commands is wireless. The PCB is in this case indicated with reference numeral 70A, and the cable 73 and the connectors 74, 24 are absent.

The PCB 70A therefore comprises a transmitter—or a transceiver and a power source, for example a button battery. The PCB 70A can in this case comprise more sophisticated electronics than that in the PCB 70 of the embodiment with wired communication.

Figure 9:
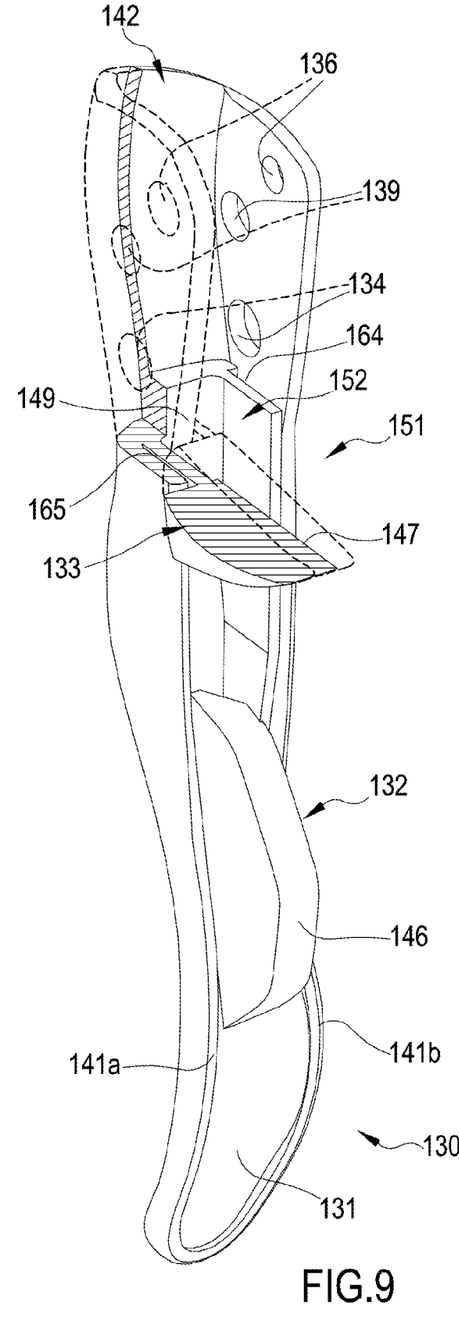
FIG. 9 is a perspective and partially sectional view of a multi-control element of a further embodiment of the invention.
Figure 10:
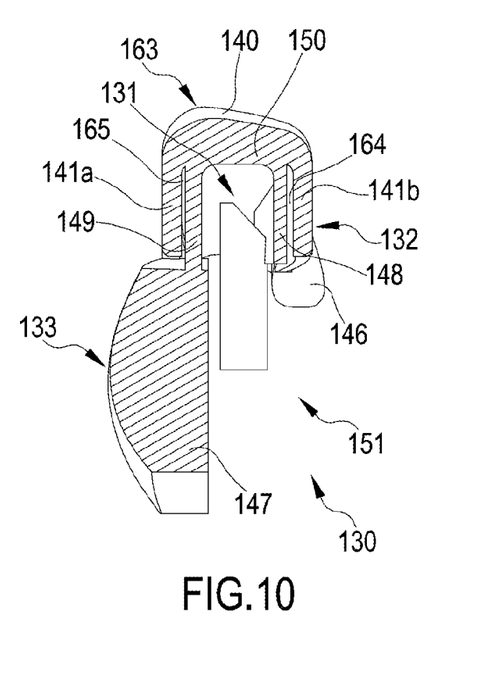
FIG. 10 is a cross sectional view of the multi-control element of FIG. 9.

FIGS. 9-10 show in part a control device of an embodiment that will be described only in how it differs from the one shown in FIGS. 1-6 and described above. The analogous parts are indicated with corresponding reference numerals, increased by 100.

The first lever-resembling control member 132 and the second lever-resembling control member 133 have an identical shape to those of the previous embodiment, but they are made in a single piece not only with each other, but also with the lever 131, to provide a multi-control element 130.

The front wall 140 of the lever 131 is made thicker at the constraint region or "cross-piece" 150 of the lever-resembling control members 132, 133. A joining region 163 is thus formed.

Both the side walls 141a, 141b of the lever 131, and the first lever-resembling control member 132 and the second lever-resembling control member 133 extend from the front wall 140 of the lever 131, a short distance from the respective side walls 141a, 141b of the lever 131, indicated as gap 164, 165, respectively.

It is thus possible to identify also in the multi-control element 130 a single body 151 comprising the first lever-resembling control member 132 and the second lever-resembling control member 133, joined by the "cross-piece" 150 that is a single piece with the front wall 140 of the lever 131 at the joining region 163.

Also in this case, there can be only one of the two lever-resembling control members 132, 133, or more than two, and the same generalizations indicated above with reference to the first embodiment apply in general.

FIGS. 9-10 omit the PCB with the switches and the actuation pins, where provided for, as well as the bicycle-fixing-body.

This embodiment is particularly advantageous since it totally lacks connection elements for the lever-resembling control members 132, 133, and implements a multi-control element or control sub-set 130 that can be disassembled in an extremely simple manner as a single piece from the bicycle-fixing-body (FIG. 1).

This embodiment can be made of metal, for example steel or aluminum, through moulding.

However, it is particularly suitable for being made of a composite material like the one described above, comprising a thermoplastic or thermosetting matrix with reinforcing fibre—preferably carbon fibre, glass fibre, aramid fibre, ceramic fibre, boron fibre and/or combinations thereof.

In an embodiment in composite material, layers of composite material are laid over one another to form the desired thickness of each part of the control sub-set 130. The gap 164, 165 between the lever-resembling control member 132, 133, respectively, and the adjacent side wall 141a, 141b, respectively, is formed from a thin wall of the mould or, preferably, an anti-adhesion or release material that is then removed.

For example, layers of reinforcing fibre are laid over one another in a half-mould until the desired shape and thickness of the region that is to form the side walls 141a, 141b of the lever 131 are formed, said layers also forming a part of the thickness of the wall in the joining region 163 and the entire thickness of the front wall 140 of the lever 131 elsewhere.

The layers of reinforcing fibre may or may not be pre-impregnated with the thermoplastic or thermosetting material. In them, the length and orientation of the reinforcing fibre will be selected in a suitable manner by those skilled in the art; the reinforcing fibre may or may not be woven.

Two sheets of suitable thickness of anti-adhesion material, or of whatever sheet material coated with an anti-adhesion film or release film, are arranged at the areas where the gaps 164, 165 are to be formed, namely the areas where the oblong bodies of the lever-resembling control members 132, 133 must extend parallel and close to the side walls 141a, 141b of the lever 131.

Further layers of reinforcing fibre are then laid over one another to form the desired shape and thickness of the lever-resembling control members 132, 133, said layers also completing the thickness of the wall in the joining region 163.

Finally, further layers of reinforcing fibre can complete the thickness of the driving regions 146, 147 of the lever-resembling control members 132, 133, making them ergonomic.

If the layers are not preimpregnated, the material of thermoplastic or thermosetting matrix is then inserted in the mould and the mould is closed, or injected into the already closed mould.

Then, the moulding chamber is subjected to a suitable temperature and/or pressure profile to cross link or set the thermoplastic or thermosetting material.

Finally, the moulded piece is extracted from the mould and the anti-adhesion material is removed.

The above is a description of various embodiments of inventive aspects, and further changes can be made without departing from the scope of the present invention. The shape and/or size and/or location and/or orientation of the various components and/or the succession of the various steps can be changed. The functions of one element or step can be carried out by two or more components or steps, and vice-versa. Components shown directly connected or in contact can have intermediate structures arranged between them. Steps shown as directly subsequent can have intermediate steps carried out between them. The details shown in a figure and/or described with reference to a figure or to an embodiment can apply in other figures or embodiments. Not all of the details shown in one figure or described in a same context necessarily have to be present in a same embodiment. Features or aspects that turn out to be innovative with respect to the prior art, alone or in combination with other features, should be deemed to be described per se, independently of what has been explicitly described as innovative.

Just as an example, although control devices for curved handlebars have been shown and described, those skilled in the art will understand that the inventive concepts find an application in general in control devices for straight handlebars or T-bars, and in "bar-end" control devices for the ends of handlebar projections.

In the case of straight handlebars or T-bars, the bicycle-fixing-body will have a substantially different shape—in a per se well known manner—to be fixed around the handlebars a certain distance from the end of the handlebars. The control sub-set will be fixed to the bicycle-fixing-body so as to project substantially frontally of the handgrip portion of the handlebars.

In the case of a "bar-end" control device, the bicycle-fixing-body will—a per se well known way—be shaped to slip on the end of the projection. The control sub-set will project forwards, in the direction of travel.

Moreover, independently of the configuration of the handlebars, the inventive concepts can also be applied in general to non-integrated control devices, namely without brake lever, to control devices of a cyclecomputer or other electronic/electromechanical device, etc.

Differently from what is shown, the lever-resembling control members could be made outside of the side walls of the brake lever, or one outside and one inside, and in general they can be arranged in any suitable position on the brake lever.

The constraint region does not necessarily have to be at the front wall of the brake lever.

The lever-resembling control members do not necessarily have to be associated with a brake lever, rather they can be directly applied to the bicycle-fixing-body of the control device—irrespective of whether it also supports a brake lever.

Furthermore, the lever-resembling control members described do not necessarily have to be associated with a bicycle-fixing-body, as shown, rather they can be directly applied to the bicycle, for example at the handlebars or to a tube of the frame.

The electrical switches controlled by the lever-resembling control members can be made on the same face of a PCB, on two or more distinct PCBs, directly on the bicycle-fixing-body, or directly on the bicycle.

More generally, there could be a single lever-resembling control member or more than two, joined together or separate.

From the description that has been made, the features of the control device and of its manufacturing method object of the present invention are manifest, just as the relative advantages are also manifest.

Moreover, it is manifest that the control device thus conceived can undergo several changes and variants, all encompassed by the invention; moreover, all of the details can be replaced by technically equivalent elements. In practice, the materials used, as well as the sizes, can be whatever according to the technical requirements.

What is claimed is:

1. A control device of a bicycle on-board electronic device, comprising:
    at least one electric switch, a change of state of the at least one switch inputting a command of the on-board electronic device,
    at least one control member having a constraint region, a driving region configured to be pushed by at least one finger, and a driven region configured to actuate said at least one switch when said driving region is actuated upon,
    wherein said at least one control member is a lever-resembling control member, wherein said constraint region, said driving region, and said driven region are made on an oblong body elastically yielding about the constraint region, wherein the driven region is displaced with respect to the driving region and/or to the constraint region purposely by virtue of the elastic yield.

2. The control device according to claim 1, wherein the constraint region is not a pivoting region.

3. The control device according to claim 1, wherein the constraint region constrains said at least one lever-resembling control member to a brake lever.

4. The control device according to claim 1, wherein two of said lever-resembling control members, having the respective driven region associated with a respective switch, are made on a single body.

5. The control device according to claim 4, wherein a common constraint region constrains said two lever-resembling control members to a brake lever.

6. The control device according to claim 5, wherein the single body has a channel shaped configuration, and the at least one switch is shaped to insert within the channel of the single body.

7. The control device according to claim 1, wherein the elastically yielding oblong body has a comparatively high yield in a pushing direction (X, Y) on the driving region, and a comparatively low yield in two directions perpendicular to the pushing direction (X, Y) and to each other.

8. The control device according to claim 7, wherein the elastically yielding oblong body has a comparatively low thickness in a pushing direction (X, Y) on the driving region, and a comparatively high thickness in two directions perpendicular to the pushing direction (X, Y) and to each other.

9. The control device according to claim 1, wherein said at least one switch comprises two switches mounted on a same printed circuit board (PCB), the PCB being housed within a channel defined in a single body carrying said two lever-resembling control members.

10. The control device according to claim 1, wherein each lever-resembling control member or said single body is co-moulded with said brake lever.

11. The control device of claim 1 further comprising:
a bicycle-fixing-body, and
a control sub-set comprising at least one lever-resembling control member,
wherein the components of the control sub-set are together in a single assembly that is separable from the bicycle-fixing-body with all of the components of the control sub-set remaining in the assembly.

\* \* \* \* \*

UNITED STATES PATENT AND TRADEMARK OFFICE
CERTIFICATE OF CORRECTION

| | | |
|---|---|---|
| PATENT NO. | : 9,711,304 B2 | |
| APPLICATION NO. | : 14/873954 | |
| DATED | : July 18, 2017 | |
| INVENTOR(S) | : Stefano Rosati | |

It is certified that error appears in the above-identified patent and that said Letters Patent is hereby corrected as shown below:

On the Title Page

Item (72), after "Rosati" delete "Vicenza (IT)" and insert therefor --Mira-VE (IT)--.

Signed and Sealed this
Sixth Day of March, 2018

Andrei Iancu
*Director of the United States Patent and Trademark Office*